United States

[11] 3,622,231

[72] Inventor Nels L. Hansen
Allen Park, Mich.
[21] Appl. No. 60,487
[22] Filed Aug. 3, 1970
[45] Patented Nov. 23, 1971
[73] Assignee Ford Motor Company
Dearborn, Mich.

[54] LENS HAVING OPTICS RADIALLY SYMMETRICAL ABOUT DIFFERENT INTERSECTING LINES
4 Claims, 2 Drawing Figs.

[52] U.S. Cl.................................................. 350/193,
240/106.1, 350/211
[51] Int. Cl.................................................. G02b 3/08
[50] Field of Search........................................... 350/211,
193; 240/106.1

[56] References Cited
UNITED STATES PATENTS
2,831,394  4/1958  Heenan et al................. 350/211 X
1,271,356  7/1918  Paige............................ 351/171
659,353  10/1900  Pitkin........................... 350/211 UX
2,596,049  5/1952  Siezen.......................... 350/211 UX Primary Examiner—John K. Corbin
Attorneys—John R. Faulkner and Robert W. Brown ABSTRACT: A lens is described which, when in use, transmits light rays emanating from a source thereof mounted in a fixed location with respect to the lens. The lens is made of a light transmitting material and comprises a base portion of uniform thickness having integral therewith a plurality of optics. A central optic is constructed about a line perpendicular to the surface of the base. Each of one or more optics which surround the central optic is radially symmetrical with respect to a line which intersects the line perpendicular to the base and which is at an acute angle therewith. The function of the optics is to efficiently transmit the light rays in a general direction which is not perpendicular to the lens base. This permits the lens to be mounted at an angle which is not perpendicular to the desired direction of light transmittal.

PATENTED NOV 23 1971

3,622,231

INVENTOR
NELS L.
HANSEN

BY John R. Faulkner
Robert W. Brown
ATTORNEYS

LENS HAVING OPTICS RADIALLY SYMMETRICAL ABOUT DIFFERENT INTERSECTING LINES

BACKGROUND OF THE INVENTION

This invention relates to a lens for the controlled transmission of light rays emanating from a source thereof mounted in a fixed location with respect to the lens. More particularly, it concerns a lens the function of which is to transmit light rays in a general direction which is not perpendicular to the lens face.

There are many situations in which it is desired to transmit light rays through a lens and in a general direction other than perpendicular to the face of the lens. One such situation occurs where a lens is mounted on the front or rear portion of the body of an automotive vehicle where the body surface is not perpendicular to the direction of travel of the automotive vehicle. In such case, it usually is desirable to mount the lens flush with the body surface, but it is also desirable to have the light rays passing through the lens and in the general direction of the forward movement of the automotive vehicle.

Another situation where it is desirable to have light rays transmitted through a lens in a direction other than perpendicular thereto occurs where a light is placed considerably above a roadway and it is necessary to have the light rays directed downwardly. Another such situation occurs where a light is placed alongside a roadway and it is desired to have the light rays directed toward vehicles approaching along the roadway. Still another example occurs where a light is placed above a doorway and flush with a wall; in such case, it may be desirable to have the light which is transmitted through the lens face directed downwardly, rather than perpendicularly from the lens face.

SUMMARY OF THE INVENTION

In accordance with the invention, a lens is provided, which, when in use, transmits light emanating from a source mounted in a fixed position with respect to the lens. The lens directs such light in a general direction that is not perpendicular to the lens face.

The lens of the invention is made from a material capable of transmitting light, preferably glass or plastic, and is comprised of a base portion having a central optic thereon, the central optic being constructed about, and preferably symmetrical about, a first line perpendicular to the base. At least one other optic substantially surrounds the central optic. This optic is integral with the base and is defined by at least two surfaces each of which is radially symmetrical with respect to a second line which intersects the first line and which forms an acute angle with the first line. One or more additional optics may be provided which are radially symmetrical with respect to one or more other lines, which are parallel to the second line and spaced therefrom and which intersect the first line. Moreover, one or more other optics may be provided which are radially symmetrical with respect to a third line which intersects the first line and which makes an acute angle with the first line which is different than the acute angle made by the second line with the first line.

As described above, the surfaces which define each of the optics are radially symmetrical with respect to some particular line. These surfaces which define the optics are either simple curved surfaces or compound curved surfaces. The kind of radial symmetry between a particular line (axis) and a surface depends upon the type of surface involved. If one of the surfaces defining the optic is a simple curved surface, then the radial symmetry involved is such that the angle between it and its axis of symmetry remains constant and the radial distance from the axis to the peak of the optic is constant. However, where a compound curved surface is radially symmetrical with respect to a particular axis, then the relation will be such that the compound curved surface will have a center of curvature which remains at a constant perpendicular distance from the particular axis involved and, again, the radial distance from the axis to the peak of the optic will be constant.

The invention will be better understood by reference to the description which follows and to the drawings.

DESCRIPTION OF THE PREFERRED EMBODIMENT

Figures 1, 2:
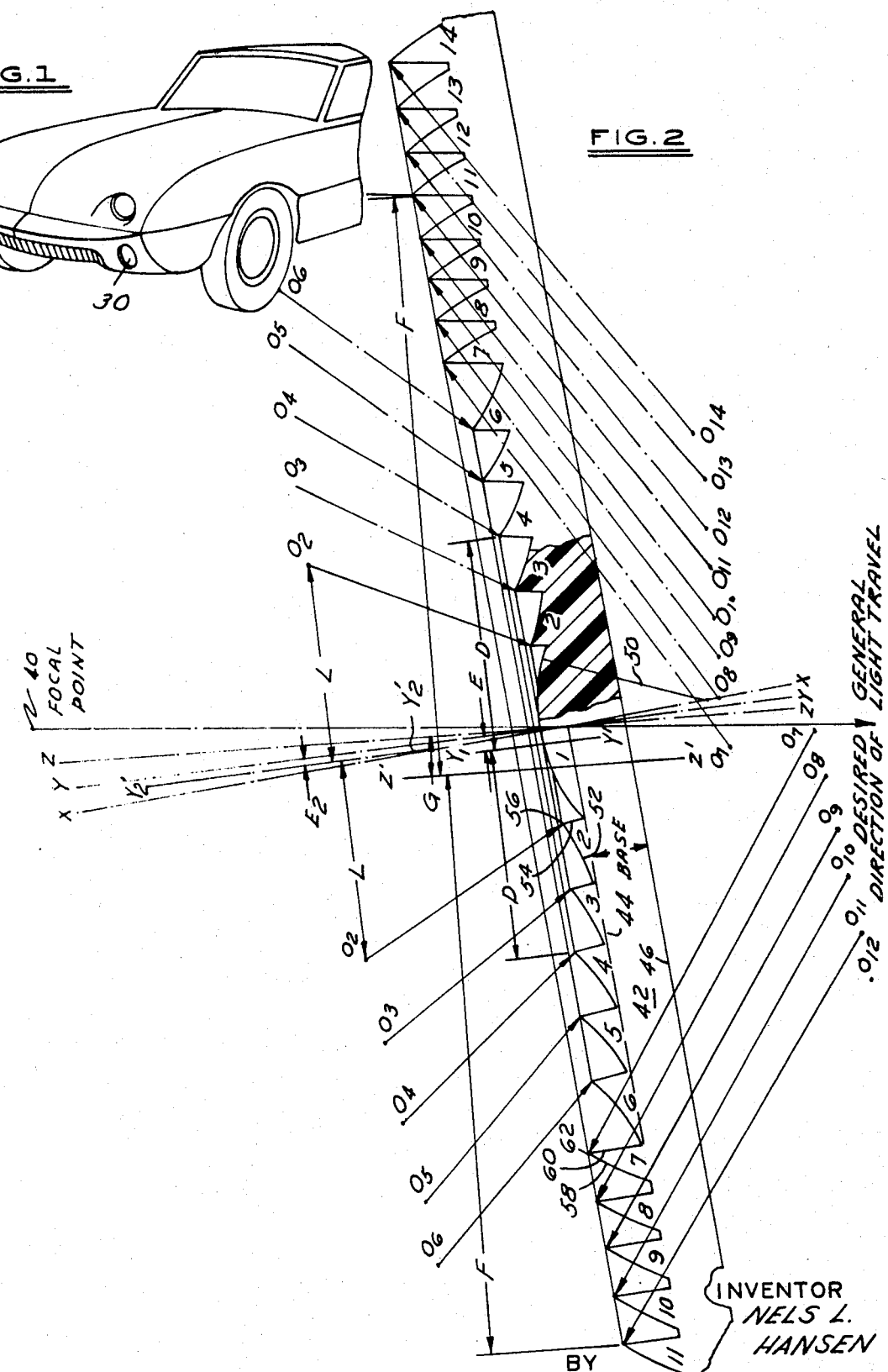
FIG. 1 is a partial pictorial view of an automobile having front areas which are curved and, thus, are not perpendicular to the direction of forward movement of the automobile.
FIG. 2 is a sectional view of a circular lens constructed in accordance with the invention.

With reference to FIG. 1, there is shown a partial pictorial view of an automobile having a horizontally curved frontal portion. Mounted at the respective sides of this horizontally curved frontal area are lenses 30—30. The lenses are necessary in order to effect the efficient transmission of light rays emanating from a source (not shown) mounted behind the lenses. The lenses also serve as means for protecting the light sources.

Ideally, the lenses would be mounted perpendicularly to the longitudinal centerline of the vehicle to effect light transmission in a general direction that is parallel to such longitudinal centerline. However, where the automobile has a curved frontal surface as shown in FIG. 1, it may be desirable to mount the lenses flush with the vehicle surface. In such case, the lenses will not be perpendicular with the longitudinal centerline of the automobile. Therefore, it is necessary to incorporate means within the structure of the lenses for transmitting the light emanating from the light source in a general direction which is parallel with the longitudinal centerline of the vehicle to achieve efficient utilization of the light.

With particular reference now to FIG. 2, there is shown a partial cross-sectional view of a lens having incorporated therein means for efficiently transmitting light emanating from a source thereof mounted in a fixed location with respect to the lens. The center of the light source would be located at a point 40, the focal point of the lens.

The lens has a base 42, which preferably is of uniform thickness and is bounded by parallel planes 44 and 46. Integral with the base 42 and located on one side thereof are a plurality of optics, denominated 1 through 14. These optics are substantially circular in shape, and with the exception of central optic 1, each of them is defined by at least two surfaces.

The desired general direction of light travel is indicated at the bottom of FIG. 2 by an arrow on a line 48 which passes through the focal point 40. As is clearly shown in FIG. 2, the plane 46 of base 42 forms an acute angle with this line 48. are compound Axis X—X X is an axis curved surfaces, is perpendicular to the base 42. Central optic 1 is constructed about this axis and is symmetrical about it in that it has a center of curvature located thereon, as is indicated by radius line 50.

In the embodiment illustrated in FIg. 2, optics 2 through 6 are dioptric optics, each formed by two surfaces 52 and 54 one of which is refractive which intersect to form a peak 56. Surfaces 52 are compound curved surfaces, and surfaces 54 are simple curved surfaces. Optics 7 through 14 are catadioptric optics, each formed by two surfaces 58 and 60 one of which is refractive which intersect to form a peak 62. Again, surfaces 58 and surfaces 60 are simple curved surfaces. A total of 14 optics are illustrated in FIG. 2. However, there may be more or less than this number, as is desired.

An axis Y—Y is shown intersecting axis X—X, which is perpendicular to base 42. Thus, axis Y—Y forms an acute angle with base 42 and with axis X—X. The acute angle formed between intersecting axes Y—Y and x—X is preferably about one-third of the acute angle formed between axis X—X and the desired general direction of light travel indicated by line 48.

Axis Y—Y is a reference axis. Optics 2 through 6 are radially symmetrical about axes which are parallel to reference axis Y—Y and which also intersect axis X—X. These parallel axes are denominated in FIG. 2 by the line Y'—Y' spaced a distance E from axis Y—Y. Preferably, the dimension E from axis Y—Y to axis Y'—Y' is made different for each of the optics 2 through 6. Thus, the axis Y'—Y' about which optic 2 is radially symmetrical would be spaced a distance $E_2$ from reference axis Y—Y, and the axis Y'—Y' about which optic 3 is radially symmetrical would be spaced a distance $E_3$, different from the distance $E_2$, from axis Y—Y. Similarly, the axes Y'—Y' for optics 4, 5 and 6 would be spaced respective distances $E_4$, $E_5$ and $E_6$ from reference axis Y—Y.

Optics 2 through 6 are radially symmetrical with respect to their respective parallel axes Y'—Y' in the sense that their respective peaks are located at a constant radial distance D measured from, and perpendicular to, their respective Y'—Y' axes. Moreover, optics 2 through 6 are symmetrical about their respective Y'—Y' axes in the sense that they are comprised of simple curved surfaces 54 which completely, or substantially, surround central optic 1 and which have a constant angular relation with respect to their respective parallel Y'—Y' axes. Optics 2 through 6 have additional radial symmetry with respect to their respective axes Y'—Y' as a result of the geometrical relation of compound curved surfaces 52 with respect to the axes. The symmetry of these compound curved surfaces 52 for optics 2 through 6 with respect to their respective axes Y'—Y' may best be described in terms of their centers of curvature, labelled $O_2$ through $O_6$ in FIG. 2. Because of the compound curvature of surfaces 52, these centers of curvature are not stationary, but rather form elliptical loci which surround the respective Y'—Y' axes. The loci of these centers of curvature appear in the sectional view of FIG. 2 as paired points, $o_2$—$O_2$, $O_3$—$O_3$, etc.

To more fully illustrate the radial symmetry of the curved surfaces 52, particular reference is now made to the curved surface 52 for optic 2 and to the centers of curvature $O_2$—$O_2$ therefor. The axis about which optic 2 is radially symmetrical is shown in FIG. 2 as axis $Y'_2$—$Y'_2$, and it is spaced a distance $E_2$ from reference axis Y—Y. The radial symmetry results from the fact that the distance L from points $O_2$ to axis $Y'_2$—$Y'_2$, measured perpendicularly thereto, is constant.

The elliptical loci of the centers of curvature $O_2$—$O_2$, $O_2$—$O_3$, etc. may be located through the specification of the height of the peaks 56 of the optics above the plane 44, by specification relative to these peaks of the distance D and of the angle made between the radius of curvature and the Y—Y axis, and also by specifying the dimension for the radius of curvature.

Optics 7 through 14 are located a considerable distance form central optic 1 and focal point 40. In view of this, they are made catadioptric optics, rather than dioptric optics, in order to effect more efficient utilization of the available light. These optics are defined by two surfaces, as are optics 2 through 6. However, these optics are symmetrical about axes Z'–Z' which are parallel to a reference axis Z—Z. Axis Z—Z forms an acute angle with respect to axis X—X. This angle preferably is approximately equal to two-thirds of the angle between axis X—X and the desired general direction of light travel. The respective Z'—Z' axes about which optics 7 and 14 are symmetrical are spaced a distance G from reference axis Z—Z, which distance may be different for each of the respective optics 7 through 14. The simple curved surfaces 60 of optics 7 through 14 are radially symmetrical with respect to their respective Z'—Z' axes in the sense that they form a constant angle with respect to these respective axes in a manner similar to that described above for surfaces 54 of optics 2 through 6. There is further radial symmetry in that the perpendicular distance F from the peak of optics 7 to 11 to the respective Z'—Z' axes therefor is constant for each of these optics. Additional symmetry occurs with respect to the compound curved surfaces 58 of optics 7 through 14. These surfaces have centers of curvature $O_7$—$O_7$, $O_8$—$O_8$, etc., which are located on elliptical loci which are a constant perpendicular distance from the respective Z'—Z' axis for the optic under consideration.

From the above, it is apparent that each of the optics 1 through 14 possesses radial symmetry with respect to an axis. Optic 1 is symmetrical about axis X—X. Each of optics 2 through 6 are symmetrical about an axis Y'—Y' which intersects the X—X axis. The Y'—Y' and spaced therefrom a distance which, for more efficient light transmission in a desired general direction, may be different for each of optics 2 through 6. The reference axis Y—Y intersects and forms an acute angle with axis X—X, axis X—X being perpendicular to the base. Each of optics 7 through 14 are symmetrical about an axis Z'—Z' which intersects and forms an acute angle with axis X—X different than the acute angle formed by axis Y—Y. The Z'—Z' axes are parallel to a reference axis Z—Z and may be spaced therefrom a distance which may be different for each of optics 7 through 14.

The lens of the invention has been described as having optics located on one side of, and integral with, a base. It should be understood that additional optics may be placed on the opposite side of the base to diffuse the transmitted light or to cause other optical effects. For example, this opposite surface of the lens may include a plurality of integral "pillow" optics constructed in a manner well understood in the art.

Various methods may be used for the manufacture of lenses constructed in accordance with the invention. The preferred method of manufacture for quantity production is molding, wherein a mold is made which is the negative of the lens to be produced. The negative of the various optics may be machined into the mold surface. In such case, it may be necessary to move the cutting tool axially along the axis of symmetry for the negative of the particular optic being machined. This axial movement of the cutting tool may be produced by a cam which axially guides the cutting tool.

Based upon the foregoing description of the invention what is claimed and desired to be protected by Letters Patent is:

1. A lens for the controlled transmittal of light rays emanating from a source mounted in a fixed position with respect to said lens, said lens being made from a material capable of transmitting light rays and comprising:
   a base;
   a central optic integral with said base and having a refractive surface constructed about a first line perpendicular to said base; and
   at least one optic integral with said base and substantially surrounding said central optic, said optic being defined by at least two surfaces one of which is refractive and each of which is radially symmetrical with respect to a second line which intersects the fist line and which forms an acute angle with the first line whereby light rays are transmitted in a general direction which is not perpendicular to the lens base.

2. A lens for the controlled transmittal of light rays emanating from a source mounted in a fixed position with respect to said lens, said lens being made from a material capable of transmitting light rays and comprising:
   a base;
   a central optic integral with said base and having a refractive surface constructed about a first line perpendicular to the surface of said base;
   a second optic integral with said base and substantially surrounding said central optic, said second optic being defined by at least two surfaces one of which is refractive and each of which is radially symmetrical with respect to a second line which intersects the first line and which forms an acute angle with the first line; and
   a third optic integral with said base and substantially surrounding said central optic, said third optic being defined by at least two surfaces one of which is refractive and each of which is radially symmetrical with respect to a third line which intersects the first line and which is parallel with the second line whereby light rays are transmitted in a general direction which is not perpendicular to the lens base.

3. A lens in accordance with claim 2, which further comprises a fourth optic integral with said base and substantially surrounding said central optic, said fourth optic being defined by at least two surfaces one of which is refractive and each of which is radially symmetrical with respect to a fourth line which intersects the first line and which forms an acute angle with the first line different from the acute angle formed with the first line by the second line.

4. A lens for the controlled transmittal of light rays emanating from a source mounted in a fixed position with respect to said lens, said lens being made from a material capable of transmitting light rays and comprising:

a base;

a central optic integral with said base and having a refractive surface constructed about a first line perpendicular to the surface of said base;

a second optic integral with said base and substantially surrounding said central optic, said second optic being defined by at least two surfaces one of which is refractive and each of which is radially symmetrical with respect to a second line which intersects the first line and which forms an acute angle with the first line; and a third optic integral with said base and substantially surrounding said central optic, said third optic being defined by at least two surfaces one of which is refractive and each of which is radially symmetrical with respect to a third line which intersects the first line and which forms an acute angle with the first line different from the acute angle formed with the first line by the second line whereby light rays are transmitted in a general direction which is not perpendicular to the lens base.

* * * * *